(12) United States Patent
Wake et al.

(10) Patent No.: US 7,926,627 B2
(45) Date of Patent: Apr. 19, 2011

(54) PAD SETS FOR DISK BRAKES

(75) Inventors: Masaki Wake, Nishikamo-gun (JP); Yuichi Takeo, Toyota (JP)

(73) Assignee: Advics Co., Ltd., Kariya-Shi, Aichi-Ken (JP)

( * ) Notice: Subject to any disclaimer, the term of this patent is extended or adjusted under 35 U.S.C. 154(b) by 742 days.

(21) Appl. No.: 11/857,782

(22) Filed: Sep. 19, 2007

(65) Prior Publication Data

US 2008/0087503 A1    Apr. 17, 2008

(30) Foreign Application Priority Data

Oct. 12, 2006    (JP) ................................. 2006-278396

(51) Int. Cl.
    *F16D 65/092*    (2006.01)
(52) U.S. Cl. ............... 188/73.37; 188/250 F; 188/250 B
(58) Field of Classification Search .............. 188/73.35, 188/73.36, 73.37, 250 B, 250 E, 250 F, 250 G
    See application file for complete search history.

(56) References Cited

U.S. PATENT DOCUMENTS

| 4,995,482 | A * | 2/1991 | Kobayashi et al. | ......... 188/73.1 |
| 6,298,956 | B1 * | 10/2001 | Gerhardt et al. | ......... 188/73.37 |

FOREIGN PATENT DOCUMENTS

| EP | 1591687 | A1 * | 11/2005 |
| GB | 1572822 | | 8/1980 |
| JP | 52-119767 | | 10/1977 |
| JP | 4-1747 | U | 1/1992 |
| JP | 4-117935 | U | 10/1992 |
| JP | 06200965 | A * | 7/1994 |
| JP | 7-208516 | A | 8/1995 |
| JP | 8-240234 | A | 9/1996 |
| JP | 10026156 | A * | 1/1998 |
| JP | 10-122277 | A | 5/1998 |

OTHER PUBLICATIONS

Japanese Office Action (Notification of Reasons for Rejection) dated Oct. 26, 2010, issued by the Japanese Patent Office in corresponding Japanese patent application No. 2006-278396.

* cited by examiner

*Primary Examiner* — Thomas J Williams

(74) *Attorney, Agent, or Firm* — Buchanan Ingersoll & Rooney PC

(57) ABSTRACT

The present invention can include a disk brake having a pad with an engaging groove formed in the pad, the pad also includes a convex member projected from one portion of the pad, a shim is positioned between the pad and a pressing member for pressing the pad toward a disk rotor, the shim including an engaging member formed on a side of the shim, a hook that extends from the shin is engagable with the engaging groove, and the convex portion is able to contact the engaging member to restrain movement of the pad.

8 Claims, 3 Drawing Sheets

PAD SETS FOR DISK BRAKES

This application claims priority to Japanese patent application serial number 2006-278396, the contents of which are incorporated herein by reference.

BACKGROUND OF THE INVENTION

1. Field of the Invention

The present invention relates to a pad set for a disk brake which has a shim interposed between a pad and a pressing member for pressing the pad toward a disk rotor.

2. Description of the Related Art

In general, a shim is formed from a plate material of stainless steel, and is interposed between a pad and a pressing member (piston, etc.) for pressing the pad toward the disk rotor. When the pad is pressed against the disk rotor by the pressing member, the pad is slid on the shim interposed between the pad and the pressing member, and is moved to a stable position. Accordingly, the pad is stabilized by the shim, and a brake noise is restrained. However, the conventional shim has a structure in which a hook is arranged at an outer circumferential end and is engaged with an engaging groove at the outer circumferential end of the pad (e.g., JP-A-7-208516). Therefore, when the pad is greatly moved with respect to the shim, the hook hits against a wall face of the engaging groove and is deformed, and one portion of the hook and the shim is deformed in the direction away from the pad. Therefore, this results in problems such as brake noise being generated by the deformation of the shim, the pad not being uniformly pressed, the hook being damaged, etc., are caused.

Further, a shim having no hook and a pad corresponding to this shim are also conventionally known (e.g., JP-A-8-240234). A pair of concave portions are formed on a rear face of this pad, and projections engaged with the concave portions of the pad are formed in the shim. It is necessary that the projection and the concave portion are constructed so as to be tightly engaged, and to have a construction in which the shim does not separate from the pad. Because of this, the manufacturing accuracy must be high and it is therefore difficult to make this a commercial product. Further, since the projection is formed in the shim, a problem also exists in that the projection is easily deformed and durability is not good.

Therefore, an object of the present invention is to provide a pad set for a disk brake having a shim and a preventing deformation structure. The shim has a hook engaged with the outer circumferential end of the pad. The preventing deformation structure prevents deformation of the hook and is easily manufactured.

SUMMARY OF THE INVENTION

The present invention can include a disk brake having a pad with an engaging groove formed in the pad, the pad also includes a convex member projected from one portion of the pad, a shim is positioned between the pad and a pressing member for pressing the pad toward a disk rotor, the shim including an engaging member formed on a side of the shim, a hook that extends from the shim is engagable with the engaging groove, and the convex portion is able to contact the first engaging member to restrain movement of the pad.

Therefore, the convex portion of the pad restrains the movement of the pad with respect to the shim instead of the hook of the shim. Therefore, the convex portion can prevent deformation of the hook. Further, the convex portion and the shim are not need to be tightly engaged as in the conventional case. Therefore, the convex portion and the engaging portion are easily manufactured. Further, the shim and the convex portion have a construction in which the convex portion hit against the side end of the engaging portion of the shim. Therefore, the shim is less readily deformed and excellent in durability in comparison with a mode for applying force to a projection projected from the shim as in the conventional case.

DETAILED DESCRIPTION OF THE INVENTION

Each of the additional features and teachings disclosed above and below may be utilized separately or in conjunction with other features and teachings to provide improved pad sets. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
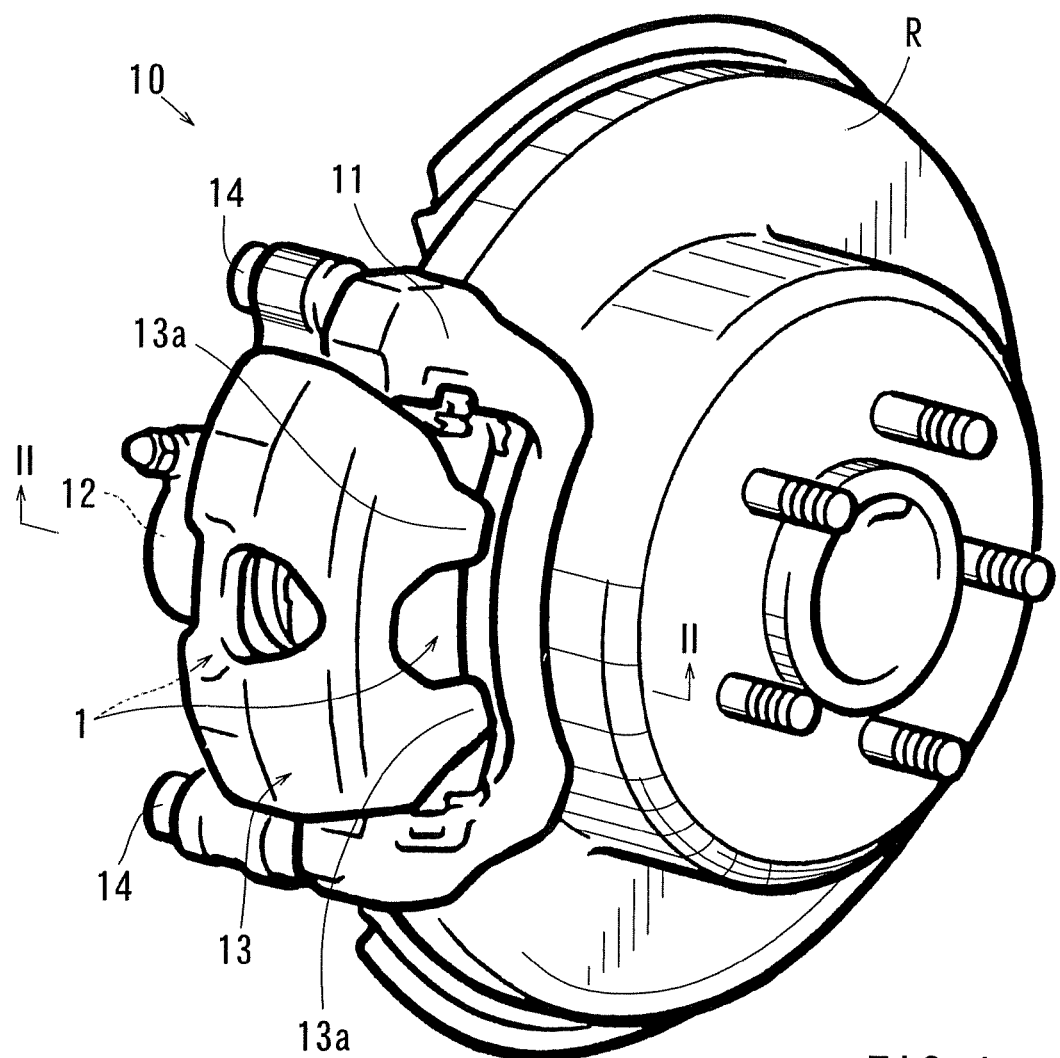
FIG. 1 is a perspective view of a disk brake according to one configuration of the present invention.
Figure 2:
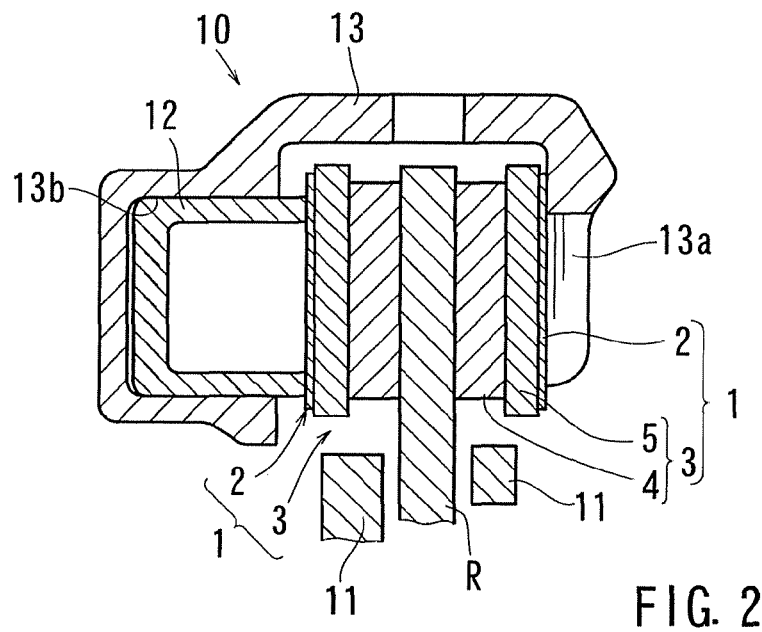
FIG. 2 is a cross-sectional view taken along line II-II in FIG. 1.

A disk brake 10 in accordance with one embodiment of the present invention will be explained in accordance with FIGS. 1 to 4. As shown in FIGS. 1 and 2, the disk brake 10 has a mounting 11 mounted on a vehicle body side, a caliper 13 movably attached to the mounting 11, and a pair of pad sets 1. The pad set 1 has a pad 3 and a shim 2 suspended and engaged with a rear face of the pad 3.

As shown in FIGS. 1 and 2, the caliper 13 is attached to the mounting 11 by a pair of slide pins 14 so as to be movable in the rotor axis direction. The caliper 13 is extended from the vehicle body side so as to straddle both sides of the disk rotor R in the rotor axis direction. A cylinder portion 13b is provided at a base end portion of the caliper 13. A piston (pressing member) 12 is set in the cylinder portion 13b. A pair of claw portions (pressing members) 13a are arranged in a tip portion of the caliper 13.

The piston (pressing member) 12 is advanced toward a disk rotor R by liquid pressure in the cylinder portion 13b. And the piston 12 presses the pad 3 interposed between the piston 12 and the disk rotor R toward the disk rotor R. The reaction to this pressure moves the caliper 13, and the claw portions 13a of the caliper 13 presses the pad 3 interposed between the disk rotor R and the claw portions 13a toward the disk rotor R. Accordingly, this one pair of pads 3 each is pressed against the disk rotor R, by the piston 12 and the claw portions 13a acting as respective pressing members.

Figure 3:
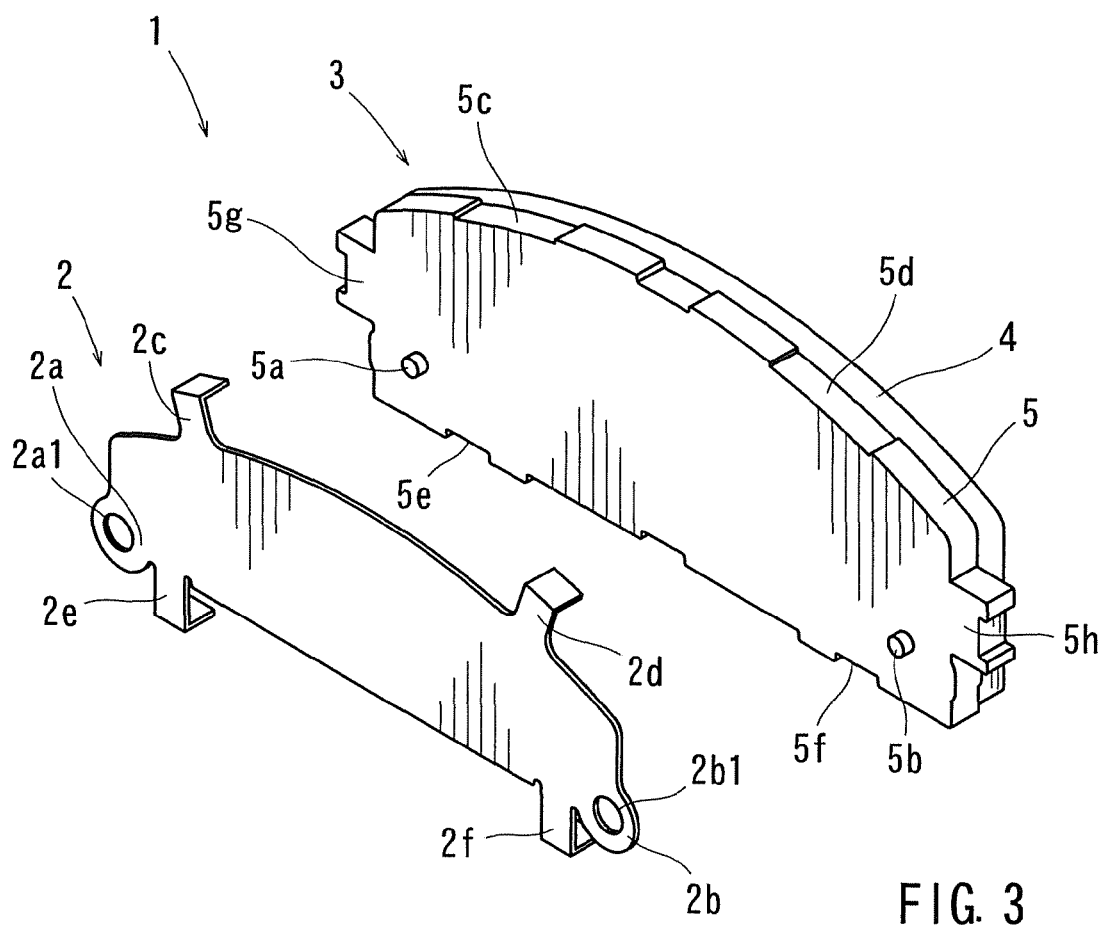
FIG. 3 is a perspective view of a pad set according to one configuration of the present invention.

The pad 3 has a friction member 4 coming in slide contact with the disk rotor R and generating frictional force, integrated with a back plate member 5 for supporting the back of the friction member 4. The back plate member 5 can be made from a metal or resin, and has guide portions 5g, 5h at both ends as shown in FIG. 3. The guide portions 5g, 5h are projected from both the ends of the back plate member 5, and are movably attached to the mounting 11 (see FIG. 1).

As shown in FIG. 3, plural (e.g., four) engaging grooves 5c to 5f are formed at an outer circumferential end of the back plate member 5. Two engaging grooves 5c, 5d are located in an outer circumferential portion further outward in the rotor radial direction. The other two engaging grooves 5e, 5f are located in an inner circumferential portion further inside in the rotor radial direction of the back plate member 5.

Figure 4:
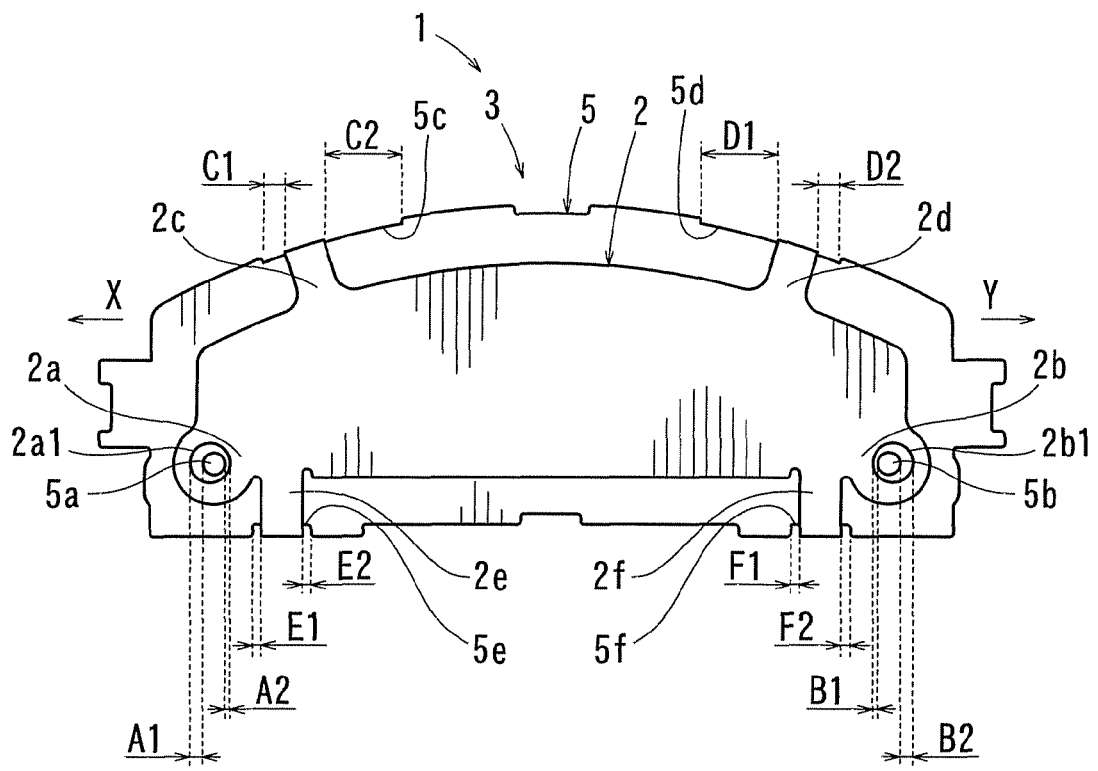
FIG. 4 is a rear view of the pad set.

As shown in FIGS. 3 and 4, a pair of convex portions or members 5a, 5b has a columnar shape. And the convex portions 5a, 5b are formed on the back face of the back plate member 5. One of convex portions 5a, 5b is located at one end portion in the disk rotor circumferential direction of the back plate member 5, the other one is located at the other end portion of the back plate member 5. The convex portions 5a, 5b are not covered with the shim 2 and projected from the back face of the back plate member 5. These convex portions 5a, 5b, together with the pad 3, are moved with respect to the shim 2 when braking, and abut on the shim 2 in a side direction. The convex portions 5a, 5b are arranged in positions in order to not obstruct the pressing member (12, 13a).

The shim 2 can be made from stainless steel, and is interposed between the pressing member (piston 12 or claw portion 13a) and the pad 3. As shown in FIGS. 3 and 4, plural (e.g. four) hooks 2c to 2f are formed at an outer circumferential end of the shim 2. The hooks 2c to 2f are extended from the outer circumferential end of the shim 2 toward the pad 3. Two hooks 2c, 2d are formed extending outward in the rotor diametrical direction from the outer circumferential portion of the shim 2, and are engaged with engaging grooves 5c to 5f. The other two hooks 2e, 2f are formed extending inward in the rotor diametrical direction from the inner circumferential portion of the shim 2, and are engaged with engaging grooves 5e, 5f. Thus, the shim 2 is prevented from moving in the rotor radial direction with respect to the pad 3.

As shown in FIGS. 3 and 4, a pair of engaging portions or members 2a, 2b are formed in portions on both sides of the rotor circumferential direction of the shim 2. The engaging portions 2a, 2b are located at corner portions on both sides of the shim 2 in the rotor circumferential direction and toward the center of the rotor in the rotor radial direction. The engaging portions 2a, 2b have through holes 2a1, 2b1 in positions for receiving the convex portions 5a, 5b, and the convex portions 5a, 5b are projected into the through holes 2a1, 2b1. When the pad 3 is moved with respect to the shim 2, the convex portions 5a, 5b hit against hole ends of the through holes 2a1, 2b1 sideways.

As shown in FIG. 4, clearances A, B are formed between the convex portions 5a, 5b and the engaging portions 2a, 2b. The clearances A, B have clearances A1, B1 on an X-direction side of the convex portions 5a, 5b, and also have clearances A2, B2 on a Y-direction side. Clearances C to F are formed between hooks 2c to 2f and engaging grooves 5c to 5f. The clearances C to F have clearances C1 to F1 on an X-direction side of hooks 2c to 2f, and also have clearances C2 to F2 on a Y-direction side.

As shown in FIG. 4, when the pad 3 is pressed against the disk rotor R in case a vehicle is moving forward, the pad 3 receives force in a X-direction. The X-direction is a tangential direction of forward rotation of the disk rotor R. And the pad 3 moves in the X-direction with respect to the shim 2. The convex portion 5b of the pad 3 then hits against a hole end of the through hole 2b1 of the engaging portion 2b, and the movement of the pad 3 in the X-direction is restrained. At this time, hooks 2c to 2f are not hitting against wall faces of engaging grooves 5c to 5f. In other words, hooks 2c to 2f have the relation of B1<A1, B1<C1 . . . B1<F1. The engaging portion 2b receives force toward the center of the shim 2 by the convex portion 5b, and receives force in the compression direction.

As shown in FIG. 4, when the pad 3 is pressed against the disk rotor R in case the vehicle is moving rearward, the pad 3 receives force in the rearward rotation tangential direction (Y-direction) of the disk rotor R and is moved in the Y-direction with respect to the shim 2. The convex portion 5a of the pad 3 then hits against a hole end of the through hole 2a1 of the engaging portion 2a and the movement of the pad 3 in the Y-direction is restrained. At this time, hooks 2c to 2f are not hitting against the wall faces of engaging grooves 5c to 5f. In other words, hooks 2c to 2f have the relation of A2<B2 . . . A2<F2. The engaging portion 2a receives force toward the center of the shim 2 by the convex portion 5a, and receives force in the compression direction.

The sum of clearances A2, B1 of the convex portions 5a, 5b and the engaging portions 2a, 2b toward the center of the shim 2 is smaller than the sum of clearances A1, B2 of the convex portions 5a, 5b and the engaging portions 2a, 2b of the shim 2 toward the outside of the shim 2. In other words, the relation of A2+21 A1+B2 is formed. Therefore, the convex portions 5a, 5b have a construction which pushes the engaging portions 2a, 2b toward the center of the shim 2, and which does not pull the engaging portions 2a, 2b away from the center of the shim 2. Accordingly, damage to outside portions of the engaging portions 2a, 2b can be prevented.

As shown in FIG. 3, the shim 2 has hooks 2c to 2f engaged with engaging grooves 5c to 5f of the outer circumferential end of the pad 3. The pad 3 has the convex portions 5a, 5b projected from one portion of the back face where it is not covered with the shim 2. When braking, the pad 3 is moved with respect to the shim 2, and the convex portions 5a, 5b hit against the side end of the engaging portions 2a, 2b of the shim 2 so that the movement of the pad 3 is restrained.

Accordingly, the convex portions 5a, 5b of the pad 3 restrain the movement of the pad 3 with respect to the shim 2 instead of the hooks 2c to 2f of the shim 2. Therefore, the convex portions 5a, 5b can prevent deformation of hooks 2c to 2f. Further, the convex portions 5a, 5b and the shim 2 are not need to be tightly engaged as in the conventional case. Therefore, the convex portions 5a, 5b and the engaging portions 2a, 2b are easily manufactured. Further, the shim 2 and the convex portions 5a, 5b have a construction in which the convex portions 5a, 5b hit against the side end of the engaging portions 2a, 2b of the shim 2. Therefore, the shim 2 is less readily deformed and has excellent durability in comparison with a mode for applying force to a projection projected from the shim as in the conventional case.

Further, as shown in FIG. 4, the engaging portions 2a, 2b of the shim 2 have the through holes 2a1, 2b1, and the convex portions 5a, 5b are projected into the through holes 2a1, 2b1. Since the convex portions 5a, 5b hit against the hole ends of the through holes 2a1, 2b1, the movement of the pad 3 with respect to the shim 2 is regulated. Accordingly, since the engaging portions 2a, 2b are not tightly engaged with the convex portions 5a, 5b, the engaging portions 2a, 2b have a form which can be easily manufactured.

Further, as shown in FIG. 4, the pad 3 has convex portions 5a, 5b in the two side portions. When the pad 3 is moved from one side to the other side in a X-direction with respect to the shim 2, the convex portion 5b located at the one side hits against the engaging portion 2b formed in the corresponding side portion of the shim 2 and pushes the engaging portion 2b toward the center of the shim 2. When the pad 3 is moved from the other side to the one side in the reverse direction (or Y-direction) with respect to the shim 2, the convex portion 5a located at the other side hits against the engaging portion 2a formed in the other side of the shim 2, and pushes the engaging portion 2a toward the center of the shim 2.

Accordingly, the pad 3 has one pair of convex portions 5a, 5b, and each of the convex portions 5a, 5b hits against one of the pair of engaging portions 2a, 2b formed in the shim 2. Since the respective convex portions 5a, 5b push the respective engaging portions 2a, 2b toward the center of the shim 2, the engaging portions 2a, 2b receive force in the compression direction. Therefore, it is possible to prevent the engaging portions 2a, 2b from being pulled from the center of the shim 2, which can result in damage, etc. Thus, a construction able to restrain damage to the shim 2 is attained.

Further, the movement of the pad 3 in the rotor radial direction with respect to the shim 2 is regulated by the convex portions 5a, 5b and the engaging portions 2a, 2b instead of hooks 2c to 2f. Therefore, the widths of the hooks 2c to 2f can be reduced. Thus, frictional force of the pad 3 in the rotor radial direction with respect to the shim 2 can be reduced. With this configuration, the pad 3 can easily move with respect to the shim 2, and brake noise can be effectively restrained.

Figure 5:
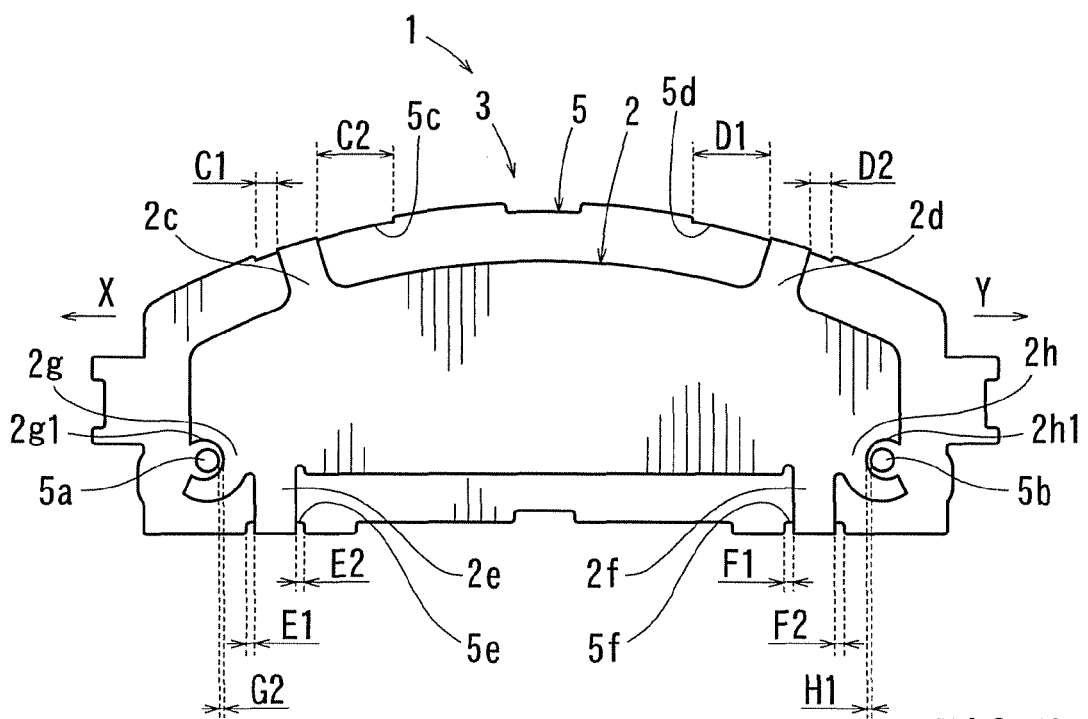
FIG. 5 is a rear view of a pad set according to another configuration of the present invention.

Another configuration according to the present invention will be described in reference to FIG. 5. This configuration is similar to the one shown in FIG. 4. However, FIG. 5 includes engaging portions 2g, 2h instead of the engaging portions 2a, 2b. FIG. 5 will be described below, the description focusing on differences from FIG. 4.

As shown in FIG. 5, the shim 2 has plural hooks 2c to 2f and a pair of engaging portions 2g, 2h. The engaging portions 2g, 2h are formed at both sides of the shim 2 in the rotor circumferential direction. The engaging portions 2g, 2h are located at the corner portions on both sides of the shim 2 in the rotor circumferential direction and toward the center of the rotor in the rotor radial direction. The engaging portions 2g, 2h have concave portions 2g1, 2h1. The concave portions 2g1, 2h1 are formed by concaving the outer circumferential end of the shim 2 in a central direction of the shim 2. The concave portions 2g1, 2h1 don't cover the convex portions 5a, 5b. And the convex portions 5a, 5b are inserted into the concave portions 2g1, 2h1.

Clearances G, H are formed between the convex portions 5a, 5b and the engaging portions 2g, 2h. Clearance G has clearance G2 on the Y-direction side of the convex portion 5a, and clearance H has clearance H1 on the X-direction side of the convex portion 5b. When the pad 3 is pressed against the disk rotor R when the vehicle is moving forward, the pad 3 is moved in the X-direction. The convex portion 5b hits against an end of the concave portion 2h1 of the engaging portion 2h, and the movement of the pad 3 in the X-direction is regulated. At this time, hooks 2c to 2f are not hitting against wall faces of engaging grooves 5c to 5f. In other words, hooks 2c to 2f have the relation of H1<C1 . . . H1<F1. The engaging portion 2h receives force toward the center of the shim 2 from the convex portion 5b, and receives force in the compression direction.

When the pad 3 is pressed against the disk rotor R when the vehicle is moving rearward, the pad 3 receives force in the Y-direction and is moved in the Y-direction with respect to the shim 2. The convex portion 5a of the pad 3 then hits against an end of the concave portion 2g1 of the engaging portion 2g, and the movement of the pad 3 in the Y-direction is restrained. At this time, hooks 2c to 2f are not hitting against the wall faces of engaging grooves 5c to 5f. In other words, hooks 2c to 2f have the relation of C2 . . . G2<F2. The engaging portion 2g receives force toward the center of the shim 2 from the convex portion 5a, and receives force in the compression direction.

As shown in FIG. 5, the engaging portions 2g, 2h of the shim 2 have the concave portions 2g1, 2h1. The concave portions 2g1, 2h1 are formed by concaving the outer circumferential end of the shim 2 toward the center of the shim 2. The movement of the pad 3 with respect to the shim 2 is regulated by the convex portions 5a, 5b hitting the concave portions 2g1, 2h1 arranged nearby the concave portions 2g1, 2h1. Accordingly, since the engaging portions 2g, 2h are not tightly engaged with the convex portions 5a, 5b, the engaging portions 2g, 2h have a structure which can be simply formed.

While the invention has been described with reference to specific configurations, it will be apparent to those skilled in the art that many alternatives, modifications and variations may be made. Accordingly, the present invention is intended to embrace all such alternatives, modifications and variations that may fall within the spirit and scope of the appended claims. For example, the present invention should not be limited to the representative configurations, but may be modified as described below.

In FIGS. 4 and 5, the shim 2 has the one pair of hooks 2c, 2d formed in its outer circumferential portion and the one pair of hooks 2e, 2f formed in its inner circumferential portion. However, it can be configured in a way that the shim has only one hook at the outer circumferential portion or the inner circumferential portion, or three or more hooks of the outer circumferential portion or the inner circumferential portion.

In FIGS. 4 and 5, the pad set has one shim. However, it can be configured in a way that the pad set has plural shims and at least one of these shims has a form in accordance with one of above configurations, etc.

In FIGS. 4 and 5, the pad set has one pair of convex portions 5a, 5b and has respective one pair of engaging portions 2a, 2b or 2g, 2h. However, it can be configured in a way that the pad set has one convex portion and one engaging portion, and the convex portion hits against one portion side end of the engaging portion when braking forward motion and when braking rearward motion, and the movement of the pad with respect to the shim is restrained.

The invention claims:

1. A pad set for a disk brake comprising:
   a pad having an engaging groove formed in the pad;
   a shim positioned between a back face of the pad and a pressing member for pressing the pad toward a disk rotor, the shim including a first engaging member and a second engaging member, each engaging member having an inner part facing away from the center of the shim and an opposing outer part facing toward the center of the shim, wherein:
   the shim has a hook engaged with the engaging groove of the pad,
   the pad has a first convex portion projected from one portion of the back face and a second convex portion projected from another portion of the back face,
   the first and second convex portions are not covered by the shim, and
   movement of the pad is restrained by the first and second convex portions each contacting a side end of the first and second engaging members, respectively, of the shim when the pad is moved with respect to the shim, the first convex portion is provided at one end portion of the pad and the second convex portion is provided at an opposite end portion of the pad, the first engaging member is provided at one end portion of the shim and the second engaging member is provided at an opposite end portion of the shim, when the pad is moved with respect to the shim in a direction from the one end portion of the shim toward the opposite end portion of the shim, the first convex portion at the one end portion of the pad hits against the inner part of the first engaging member at the one end portion of the shim and pushes the inner part of the first engaging member at the one end portion of the shim toward the center of the shim without pushing against the opposing outer part of the second engaging member at the opposite end of the shim, and when the pad is moved in a direction with respect to the shim from the opposite end portion of the shim to the one end portion of the shim, the second convex portion at the opposite end portion of the pad hits against the inner part of the second engaging member at the opposite end portion of the shim and pushes the inner part of the second engaging member at the opposite end portion of the shim toward the center of the shim without pushing against the opposing outer part of the first engaging member at the one end of the shim.

2. The pad set as in claim 1, wherein the engaging member of the shim has a through hole, and the convex portion of the pad extends into the through hole.

3. The pad set as in claim 1, wherein the engaging member of the shim has a concave portion positioned at an outer circumferential end of the shim, and the convex portion of the pad extends into the concave portion.

4. The pad set for a disk brake as in claim 1, further comprising:
a first inner clearance formed between the first convex portion and the first engaging member to allow the movement of the first convex portion toward the second engaging member of the shim;
a first outer clearance formed between the first convex portion and the first engaging member to allow the movement of the first convex portion away from the second engaging member of the shim;
a second inner clearance formed between the second convex portion and the second engaging member to allow the movement of the second convex portion toward the first engaging member of the shim; and
a second outer clearance formed between the second convex portion and the second engaging member to allow the movement of the second convex portion away from the first engaging member of the shim, wherein:
the first inner clearance is smaller than the second outer clearance, and
the second inner clearance is smaller than the first outer clearance.

5. A disk brake comprising:
a pad having a plurality of engaging grooves formed in the pad, the pad further including a first convex member projected from one portion of the pad and a second convex member positioned opposite the first convex member;
a shim positioned between the pad and a pressing member for pressing the pad toward a disk rotor, the shim including
a first engaging member formed on a side of the shim, the first engaging member having an inner part facing away from the center of the shim and an opposing outer part facing toward the center of the shim; and
a second engaging member positioned opposite the first engaging member, the second engaging member having an inner part facing away from the center of the shim and an opposing outer part facing toward the center of the shim;
a plurality of hooks extending from the shim and engagable with the plurality of engaging grooves,
wherein the first convex member is able to contact the first engaging member to restrain movement of the pad;
when the pad is moved in a first direction, the first convex member contacts the inner part of the first engaging member and pushes the inner part of the first engaging member toward the center of the shim without pushing against the opposing outer part of the second engaging member; and
when the pad is moved in a second direction opposite from the first direction, the second convex member contacts the inner part of the second engaging member and pushes the inner part of the second engaging member toward the center of the shim without pushing against the opposing outer part of the first engaging member.

6. The disk brake as in claim 5, wherein the first engaging member of the shim has a through hole, and the first convex member of the pad extends into the through hole.

7. The disk brake as in claim 5, wherein the first engaging member of the shim is concave, and the first convex member of the pad extends into engaging member.

8. The disk brake set as in claim 5, further comprising:
a first inner clearance capable of being formed between the first convex member and the first engaging member to allow the movement of the first convex member toward the second engaging member of the shim;
a first outer clearance capable of being formed between the first convex member and the first engaging member to allow the movement of the first convex member away from the second engaging member of the shim;
a second inner clearance capable of being formed between the second convex member and the second engaging member to allow the movement of the second convex member toward the first engaging member of the shim; and
a second outer clearance capable of being formed between the second convex member and the second engaging member to allow the movement of the second convex member away from the first engaging member of the shim, wherein:
the first inner clearance is smaller than the second outer clearance, and
the second inner clearance is smaller than the first outer clearance.

* * * * *